(12) United States Patent
Mu et al.

(10) Patent No.: US 11,784,394 B2
(45) Date of Patent: Oct. 10, 2023

(54) WIRELESS COMMUNICATION DEVICES

(71) Applicant: Apple Inc., Cupertino, CA (US)

(72) Inventors: Xiaofang Mu, Cupertino, CA (US); Annie Manuja, Sunnyvale, CA (US); Christopher D. Guichet, Mountain View, CA (US); Erik G. de Jong, San Francisco, CA (US); Jorge L. Rivera Espinoza, San Jose, CA (US); Patrick J. Crowley, San Jose, CA (US); Steven C. Roach, Martinez, CA (US); Venkatesh Rajendran, San Jose, CA (US); William C. Lukens, San Francisco, CA (US); Woojin Jung, San Mateo, CA (US); Yue Chen, San Jose, CA (US); Zhiwei Gu, Cupertino, CA (US); Derek Iwamoto, Sunnyvale, CA (US); Siddharth Nangia, San Francisco, CA (US); Scott D. Morrison, Austin, TX (US); Kevin A. Klenk, Sunnyvale, CA (US); Neeloy Roy, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/544,262

(22) Filed: Dec. 7, 2021

(65) Prior Publication Data
US 2023/0084538 A1 Mar. 16, 2023

Related U.S. Application Data

(60) Provisional application No. 63/242,868, filed on Sep. 10, 2021.

(51) Int. Cl.
*H01Q 1/24* (2006.01)
*H01Q 1/52* (2006.01)
(Continued)

(52) U.S. Cl.
CPC ............ *H01Q 1/24* (2013.01); *H01Q 1/22* (2013.01); *H01Q 1/2283* (2013.01); *H01Q 1/52* (2013.01);
(Continued)

(58) Field of Classification Search
CPC ........ H01Q 1/2283; H01Q 1/24; H01Q 1/526; H01Q 9/0457; H01Q 1/22; H01Q 1/52; H01Q 9/04
(Continued)

(56) References Cited

U.S. PATENT DOCUMENTS 10,742,250 B1 8/2020 Hiemstra et al.
11,522,280 B2* 12/2022 Bae .......................... H01Q 1/42
(Continued)

*Primary Examiner* — Hai V Tran
(74) *Attorney, Agent, or Firm* — Treyz Law Group, P.C.; Tianyi He

(57) ABSTRACT

A wireless communication system may include an electronic device having a wireless communication module. The wireless communication module may include an antenna radiating element on a first surface, a ground ring surrounding the antenna radiating element on the first surface, and a radio component mounted to a second surface. The wireless communication module may be incorporated into a system package that also includes other components. Encapsulation material may cover the wireless communication module and other components. A shielding material may cover the encapsulation material and be coupled to the ground ring. An opening in the shielding material may be aligned with the antenna radiating element. If desired, the wireless communication system may include external equipment having a wireless communication module communicatively coupled to the wireless communication module to convey firmware testing, debugging, restore, and/or other data.

19 Claims, 11 Drawing Sheets

(51) Int. Cl.
  *H01Q 9/04* (2006.01)
  *H01Q 1/22* (2006.01)
(52) U.S. Cl.
  CPC ............... *H01Q 1/526* (2013.01); *H01Q 9/04* (2013.01); *H01Q 9/0457* (2013.01)
(58) Field of Classification Search
  USPC ........................................................ 343/702
  See application file for complete search history.

(56) References Cited

U.S. PATENT DOCUMENTS

| | | |
|---|---|---|
| 2017/0222301 A1 | 8/2017 | Shiu et al. |
| 2019/0097301 A1 | 3/2019 | Wu et al. |
| 2019/0165473 A1* | 5/2019 | Yun .................... H01Q 21/0025 |
| 2020/0127361 A1* | 4/2020 | Lee ...................... H05K 1/0243 |
| 2020/0153115 A1* | 5/2020 | Yun ........................ G06F 3/0412 |
| 2021/0099203 A1 | 4/2021 | Hiemstra et al. |

* cited by examiner

WIRELESS COMMUNICATION DEVICES

This application claims the benefit of U.S. provisional patent application No. 63/242,868, filed Sep. 10, 2021, which is hereby incorporated by reference herein in its entirety.

BACKGROUND

This relates generally to electronic devices, including electronic devices with wireless circuitry.

Electronic devices are sometimes provided with wired connectors that enable wired connections to external equipment. Among other issues, some wired connector structures can be bulky and take up excess space within the electronic devices. It can be desirable to provide wireless circuitry in place of wired connectors.

To satisfy consumer demand for small form factor electronic devices, manufacturers are continually striving to implement wireless circuitry using compact structures. Because antennas in the wireless circuitry have the potential to interfere with each other and with other components in a wireless communication device, care must be taken when incorporating antennas into an electronic device to ensure that the wireless circuitry is able to exhibit satisfactory performance. It can be desirable to provide improved wireless circuitry for electronic devices.

SUMMARY

An electronic device may include wireless circuitry. The wireless circuitry may be implemented in a wireless communication module that includes an antenna radiating element and a radio-frequency integrated circuit coupled to the antenna radiating element. As an example, the antenna radiating element may be a patch element formed at a surface of the module substrate and surrounded by a ground ring at the surface. The patch element may be separated from the ground ring by a distance configured to enable wave formation for (far-field) radio-frequency signals. As another example, the radio-frequency integrated circuit may be mounted on an opposing surface of the module substrate. If desired, multiple antenna signal feed terminals may be coupled to the patch element to convey the radio-frequency signals with different polarizations.

The electronic device may have a display at a first side and a housing wall at a second side opposing the first side. The housing wall may have a ledge portion along a peripheral edge of the electronic device. The ledge portion may have a depression at a corner region of the electronic device. The wireless communication module may be mounted in the electronic device to align the antenna radiating element to the depression and to enable the antenna element to convey the radio-frequency signals through the housing wall. The patch element may be separated from the dielectric housing wall by a distance configured to enable wave formation for the radio-frequency signals.

The wireless communication module may be incorporated into a system-in-package (SIP) by being mounted to the package substrate. Components such as an integrated circuit implementing control circuitry may also be mounted to the package substrate. The wireless communication module and the other components may be covered with encapsulation material to form a fully encapsulated SIP. Conductive shielding material may cover the encapsulation material and be shorted to the ground ring. An opening defined by the conductive shielding material may be aligned with the antenna element.

The electronic device may be in wireless communication with external equipment, which may also include a wireless communication module (e.g., of the same type as the wireless communication module of the electronic device). If desired, the external equipment may help test, debug, configure, restore, and/or otherwise update the firmware of the electronic device using the wireless communication link. Carrier and alignment structures for the external equipment may help align the wireless communication modules with each other.

DETAILED DESCRIPTION

Figure 1:
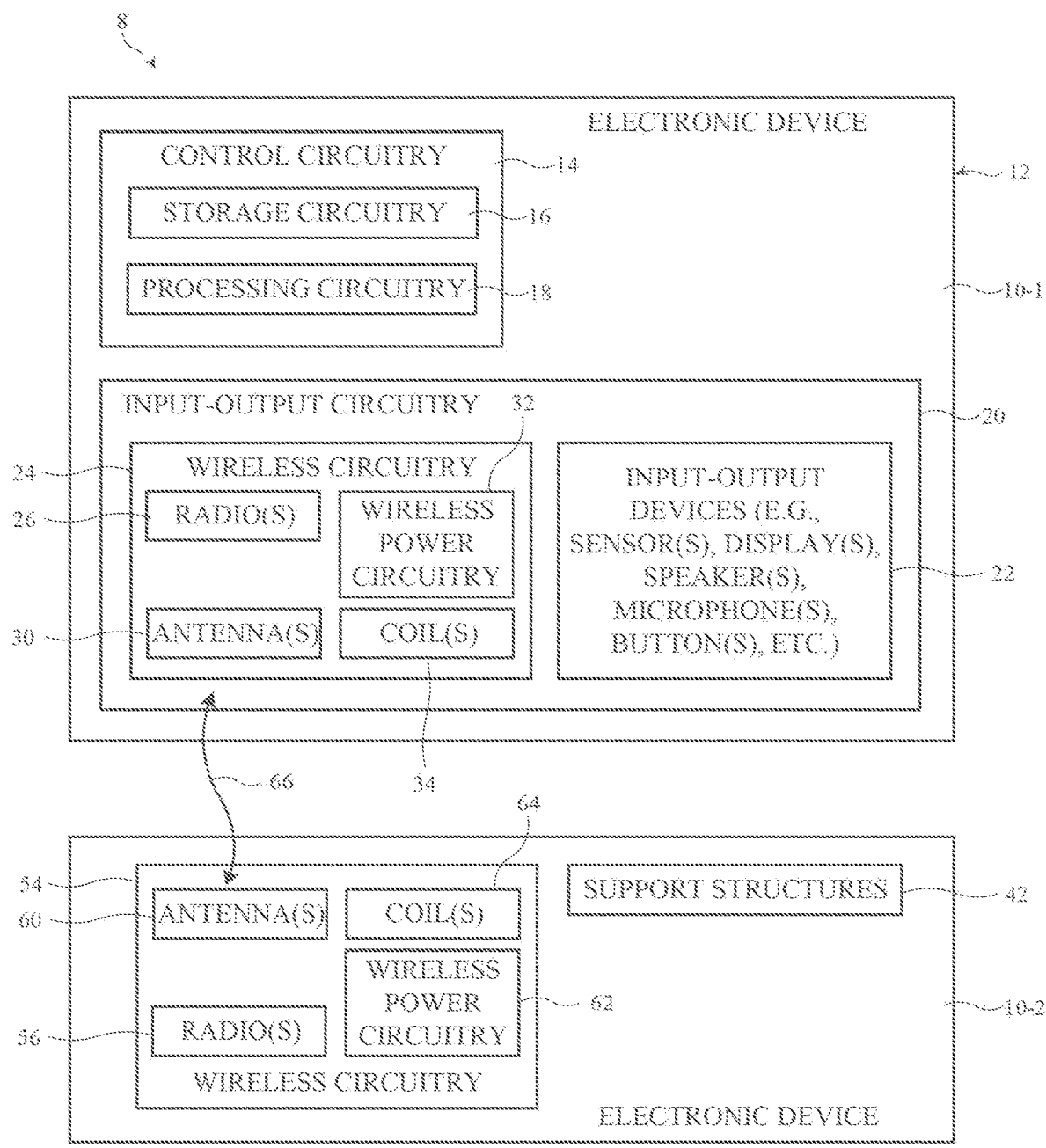
FIG. 1 is a block diagram of an illustrative wireless communication system in accordance with some embodiments.

FIG. 1 shows an illustrative system such as wireless communication system 8 that includes one or more electronic devices such as electronic devices 10-1 and 10-2 and any other electronic device(s). Electronic devices in system 8 may each be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, a wireless power device, firmware testing, debugging, or restoring equipment, equipment that implements the functionality of two or more of these devices, or other electronic equipment.

As shown in the functional block diagram of FIG. 1, an illustrative device 10-1 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10-1 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10-1 and/or removable storage media.

Control circuitry 14 may include processing circuitry such as processing circuitry 18. Processing circuitry 18 may be used to control the operation of device 10-1. Processing circuitry 18 may include on one or more processors, microprocessors, microcontrollers, digital signal processors, host processors, baseband processor integrated circuits, application specific integrated circuits, central processing units (CPUs), etc. Control circuitry 14 may be configured to perform operations in device 10-1 using hardware (e.g., dedicated hardware or circuitry), firmware, and/or software. Software code for performing operations in device 10-1 may be stored on storage circuitry 16 (e.g., storage circuitry 16 may include non-transitory (tangible) computer readable storage media that stores the software code). The software code may sometimes be referred to as program instructions, software, firmware, data, instructions, or code. Software code stored on storage circuitry 16 may be executed by processing circuitry 18.

Control circuitry 14 may be used to run software on device 10-1 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10-1 may include input-output circuitry 20. Input-output circuitry 20 may include input-output devices 22. Input-output devices 22 may be used to allow data to be supplied to device 10-1 and to allow data to be provided from device 10-1 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10-1 using wired or wireless connections.

Input-output circuitry 20 may include wireless circuitry 24 to support wireless communications and/or radio-based spatial ranging operations. Wireless circuitry 24 may include one or more antennas 30. Wireless circuitry 24 may also include one or more radios 26. Each radio 26 may include circuitry that operates on signals at baseband frequencies (e.g., baseband processor circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 30. The components of each radio 26 may be mounted onto a respective substrate or integrated into a respective integrated circuit, chip, package (e.g., system-in-package), or system-on-chip (SOC). If desired, the components of multiple radios 26 may share a single substrate, integrated circuit, chip, package, or SOC.

Antennas 30 may be formed using any desired antenna structures. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time. Wireless circuitry 24 may include any desired number of antennas 30.

Transceiver circuitry in radios 26 may convey radio-frequency signals using one or more antennas 30 (e.g., antenna(s) 30 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 30 may transmit the radio-frequency signals by radiating the radio-frequency signals into free space (or to free space through intervening device structures such as a dielectric cover layer). Antenna(s) 30 may additionally or alternatively receive the radio-frequency signals from free space (e.g., through intervening devices structures such as a dielectric cover layer). The transmission and reception of radio-frequency signals by antenna(s) 30 each involve the excitation or resonance of antenna currents on an antenna radiating element in the antenna by the radio-frequency signals within the frequency band(s) of operation of the antenna.

Radios 26 may use antennas 30 to transmit and/or receive radio-frequency signals within different frequency bands at radio frequencies (sometimes referred to herein as communications bands or simply as a "bands"). The frequency bands handled by radios 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Each radio 26 may transmit and/or receive radio-frequency signals according to a respective radio access technology (RAT) that determines the physical connection methodology for the components in the corresponding radio. One or more radios 26 may implement multiple RATs if desired.

As just one example, the radios 26 in device 10-1 may include a UWB radio for conveying UWB signals using one or more antennas 30, a Bluetooth (BT) radio for conveying BT signals using one or more antennas 30, a Wi-Fi radio for conveying WLAN signals using one or more antennas 30, a cellular radio for conveying cellular telephone signals using one or more antennas 30 (e.g., in 4G frequency bands, 5G FR1 bands, and/or 5G FR2 bands), and an NFC radio for conveying NFC signals using one or more antennas 30. This example is merely illustrative and, in general, radios 26 may include any desired combination of radios for covering any desired combination of RATs.

Wireless circuitry 24 may include wireless power circuitry such as wireless power (receiving) circuitry 32 and coil structures such as one or more coils 34. Device 10-1 may use wireless power circuitry 32 and coil 34 to receive wirelessly transmitted power (e.g., wireless charging signals) from a wireless power adapter (e.g., a wireless power transmitting device).

The wireless power adapter may pass AC currents through the wireless power transmitting coil to produce a time-varying electromagnetic (e.g., magnetic) field that is received as wireless power (wireless charging signals) by coil 34 in device 10-1. Wireless power circuitry 32 may include converter circuitry such as rectifier circuitry that generate a DC voltage for powering device 10-1 from the wireless charging signals. The DC voltage produced by the rectifier circuitry in wireless power circuitry 32 can be used in charging an energy storage device such as a battery and/or can be used in powering other components in device 10-1.

While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24).

Radios 26 may use antennas 30 to transmit and/or receive radio-frequency signals to convey wireless communication data between device 10-1 and one or more other external wireless communication equipment or devices. In the illustrative example of FIG. 1, system 8 includes electronic device 10-2 (sometimes referred to herein as external equipment 10-2 or electronic equipment 10-2), which may have one or more of the same elements as described above in connection with electronic device 10-1. In particular, as shown in FIG. 1, electronic device 10-2 may include wireless circuitry such as wireless circuitry 54 having one or more radios such as radios 56 and one or more antennas such as antennas 60.

Devices 10-1 and 10-2 may be communicatively coupled via one or more communication links 66 via respective wireless circuitry. Wireless communication data may be conveyed between devices 10-1 and 10-2 bidirectionally or unidirectionally. As examples, devices 10-1 and 10-2 may form a half-duplex communication link or a full-duplex communication link.

Configurations in which device 10-2 implements firmware update equipment such as equipment configured to perform firmware testing, debugging, restoring, and/or other functions relating to the firmware of device 10-1 are described herein as illustrative examples. If desired, device 10-2 may be or implement equipment or devices having other functionalities.

In some of these configurations for device 10-2, the wireless communication data being conveyed with device 10-1 may include data that has been encoded into corresponding data packets such as wireless data associated with software applications running on device 10-1, wireless data associated with software updates for device 10-1, wireless data associated with testing, debugging, and/or repairing device 10-1, wireless data associated with resetting or restoring device 10-1 to a default or factory setting, wireless data associated with a telephone call, a message, streaming media content, or internet browsing, etc.

In some of these configurations for device 10-2, wireless circuitry 54 in device 10-2 may include wireless power (transmitting) circuitry 62 and coil structures such as one or more coils 64. Configured in this manner, device 10-2 may use wireless power circuitry 62 and coil 64 to transmit wireless power (signals) to device 10-1.

In some of these illustrative configurations for device 10-2, device 10-2 may include support structures 42 such as platforms, carriers, docks, or other structures to which wireless circuitry and other components (e.g., control circuitry, input-output devices, etc.) for device 10-2 are mounted and which are configured to receive device 10-1. As examples, support structures 42 may be formed of plastic, glass, ceramics, fiber composites, metal, other suitable materials, or a combination of these materials.

The example of FIG. 1 is merely illustrative. If desired, system 8 may include any suitable number of electronic devices or equipment (e.g., having similar elements as device 10-1 and/or device 10-2). If desired, device 10-1 or device 10-2 may be communicatively coupled to one or more of these other electronic devices or equipment instead of or in addition to each other, or may operate in isolation at times. If desired, devices 10-1 and 10-2 may include any other suitable elements or may omit one or more elements described in connection with FIG. 1.

Figure 2:
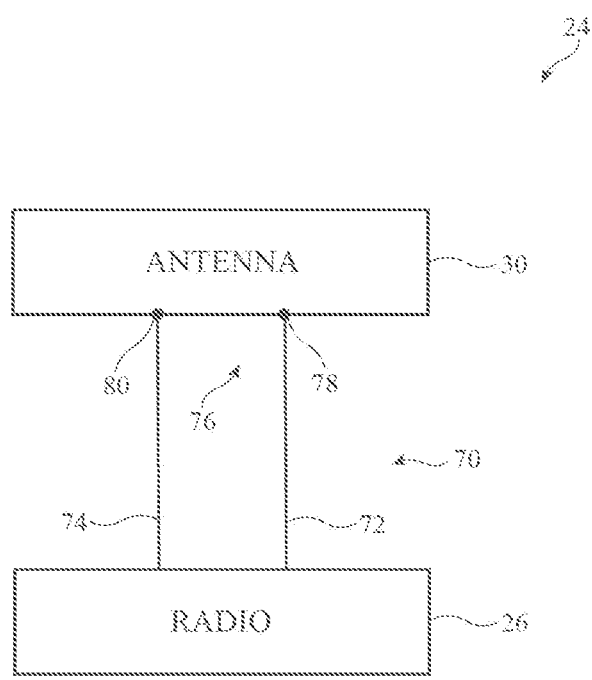
FIG. 2 is a block diagram of illustrative wireless circuitry in accordance with some embodiments.

FIG. 2 is a functional block diagram of wireless circuitry 24 of FIG. 1. As shown in FIG. 2, each radio 26 may be coupled to one or more antennas 30 over one or more radio-frequency transmission lines 70. As an illustrative example, each radio-frequency transmission line 70 may include a conductor such as signal conductor 72 and a conductor such as signal conductor 74. A corresponding antenna 30 may include an antenna feed such as antenna feed 76 having antenna feed terminal 78 coupled to conductor 72 and antenna feed terminal 80 coupled to conductor 74. If desired, transmission line 70 may include additional signal conductors coupled to additional antenna feed terminals.

One or more radio-frequency transmission lines 70 may be shared between radios 26 and/or antennas 30 if desired. Radio-frequency front end (RFFE) modules may be interposed on one or more radio-frequency transmission lines 70. The radio-frequency front end modules may include substrates, integrated circuits, chips, or packages that are separate from radios 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 70.

While FIG. 2 describes one or more radios 26 and one or more antennas 30 in device 10-1 (FIG. 1), other electronic devices such as device 10-2 and other devices in system 8 may include one or more radios and antennas configured in the same manner.

In some illustrative configurations, electronic devices may include high-data-rate wired connectors. These wired connectors can be bulky and take up excess interior space, and require external input-output ports that render the electronic device less secure. It may therefore be desirable to provide wireless circuitry that can establish high-data-rate wireless communication links.

However, providing wireless circuitry that operate at relatively high frequencies such as at one or more frequencies around 60 GHz (e.g., greater than 10 GHz), thereby allowing for high-data-rate data transfer, can raise significant challenges. As examples, it may be challenging to provide the wireless circuitry at these frequencies in a compact manner to provide space-savings, other components in each wireless device (e.g., other portions of the wireless circuitry, conductive elements, housing structures, etc.) have the potential to interfere with the operation of the wireless circuitry for establishing these wireless communication links, misalignments between the communicating devices (e.g., the respective wireless circuitry) and intervening structures between the respective wireless circuitry can degrade the wireless communication links. As such, one or more of the electronic devices in system 8 (FIG. 1) may be provided with improved wireless circuitry while taking into account one or more of these issues.

Figure 3:
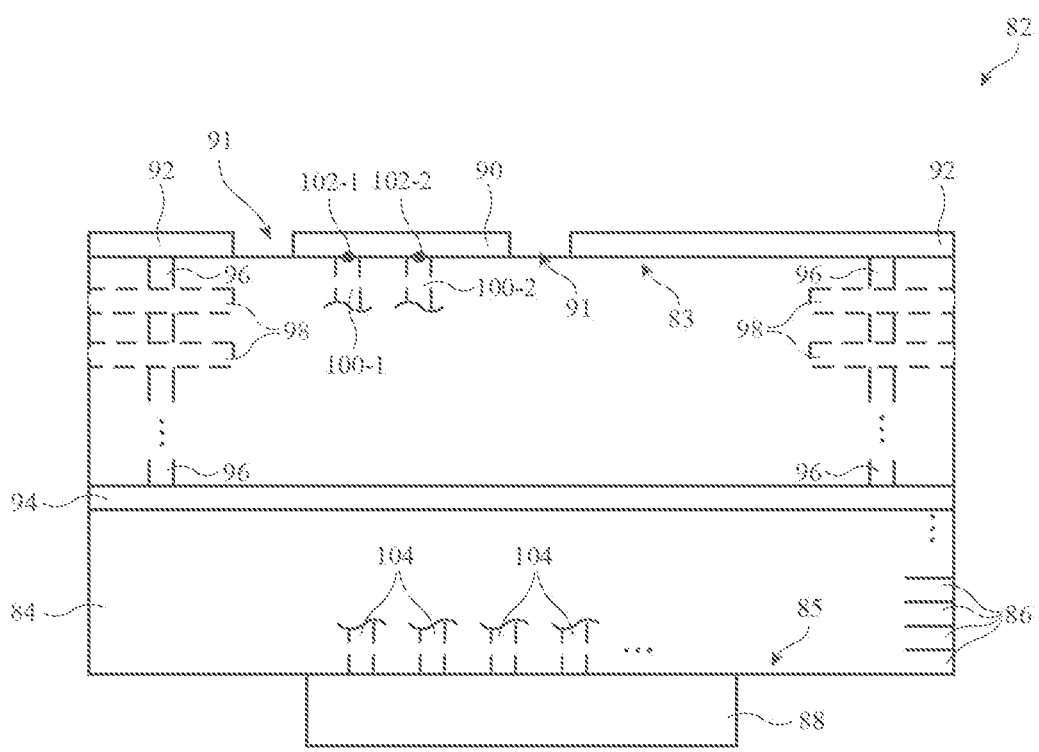
FIG. 3 is a cross-sectional view of an illustrative wireless communication module in accordance with some embodiments.

FIG. 3 is a cross-sectional view of an illustrative wireless communication module such as wireless communication module 82 that can implement wireless circuitry for one or more devices (e.g., devices in system 8 in FIG. 1). Configurations in which wireless communication module 82 operate at one or more frequencies between 10 GHz and 300 GHz (e.g., at a 60 GHz frequency band) to convey firmware testing data, firmware debugging data, firmware repair data, firmware restore data, and/or device configuration data are described herein as illustrative examples. If desired, wireless communication module 82 may operate at any suitable frequency (e.g., covering one or more suitable frequency bands) and may convey any suitable type of data for the desired function.

As shown in FIG. 3, module 82 may include a substrate such as substrate 84. Substrate 84 may include multiple layers 86 and may therefore be referred to as a multi-layer substrate. Some of layers 86 may be formed from one or more non-conductive materials such as dielectric materials, some of layers 86 may be conductive materials such as metallic materials, and some of layers 86 may be formed from other materials such as semiconducting materials.

Substrate 84 has first and second opposing surfaces (e.g., top and bottom surfaces in FIG. 3). An antenna radiating element for an antenna such as a conductive (metal) patch element 90 may be disposed on the first surface of substrate 84. An antenna ground structure for the antenna such as conductive ground layer 92 (sometimes referred to as ground ring 92) may also be disposed on the first surface of substrate 84. Ground layer 92 may surround patch element 90 and be separated from patch element 90 by dielectric gap 91. Additional antenna ground structures such as ground layer 94 for the antenna may be embedded in substrate 84. Conductive structures such as conductive vias 96 in substrate 84 may couple (e.g., electrically short) ground layer 92 at the first surface to embedded ground layer 94. One or more additional intervening conductive ground layers 98 may also be coupled (e.g., electrically shorted) to vias 96. Configured in this manner, conductive ground structures for the antenna (e.g., ground layers 92, 94, and 98, and vias 96) may surround and define a cavity for patch element 90.

Module 82 may include radio component 88 such as a radio-frequency integrated circuit or an integrated circuit implementing a radio (e.g., radio 26 in FIG. 1) for patch element 90. The integrated circuit forming radio component

88 may include one or more elements described in connection with radios 26 in FIG. 1. Radio component 88 may be mounted to the second side of substrate 84. Radio component 88 may provide antennas signals along one or more signal paths 104 to the antenna elements (e.g., patch element 90, ground structures, etc.). As an example, signal paths 104 may form transmission line structures (e.g., signal conductor paths, ground conductor paths, etc.) coupled to the antenna radiating element and the antenna ground. As shown in FIG. 3, the antenna may include one or more positive antenna feed terminals such as terminals 102-1 and 102-2 coupled to patch element 90. Radio component 88 may provide antenna signals along a first signal conductor formed from signal paths 104 and 100-1 coupled to terminal 102-1. Radio component 88 may provide antenna signals along a second signal conductor formed from signals paths 104 and 100-2 coupled to terminal 102-2. Radio component 88 may provide one or more ground conductors coupled to antenna ground structures on module 82.

If desired, module 82 may include input-output structures such as input-output pads, input-output ports, input-output pins, etc. on the second surface of substrate 84. Radio component 88 may be coupled to signal paths 104 via these input-output structures at the second surface (e.g., via solder). These input-output structures may allow module 82 (e.g., radio component 88 in module 82) to interface with other components in an electronic device. As an example, module 82 in a device and the control circuitry in the device may be mounted to a shared package substrate. In this example, the control circuitry may be couple to radio component 88 via one or more signal paths to convey data for wireless communication. These signal paths may include metal routing layers in the shared package substrate, a first set of input-output structures connecting the package substrate to module 82, metal routing layers in substrate 84, and a second set of input-output structures coupling radio component 88 to the metal routing layers in substrate 84.

Figure 4:
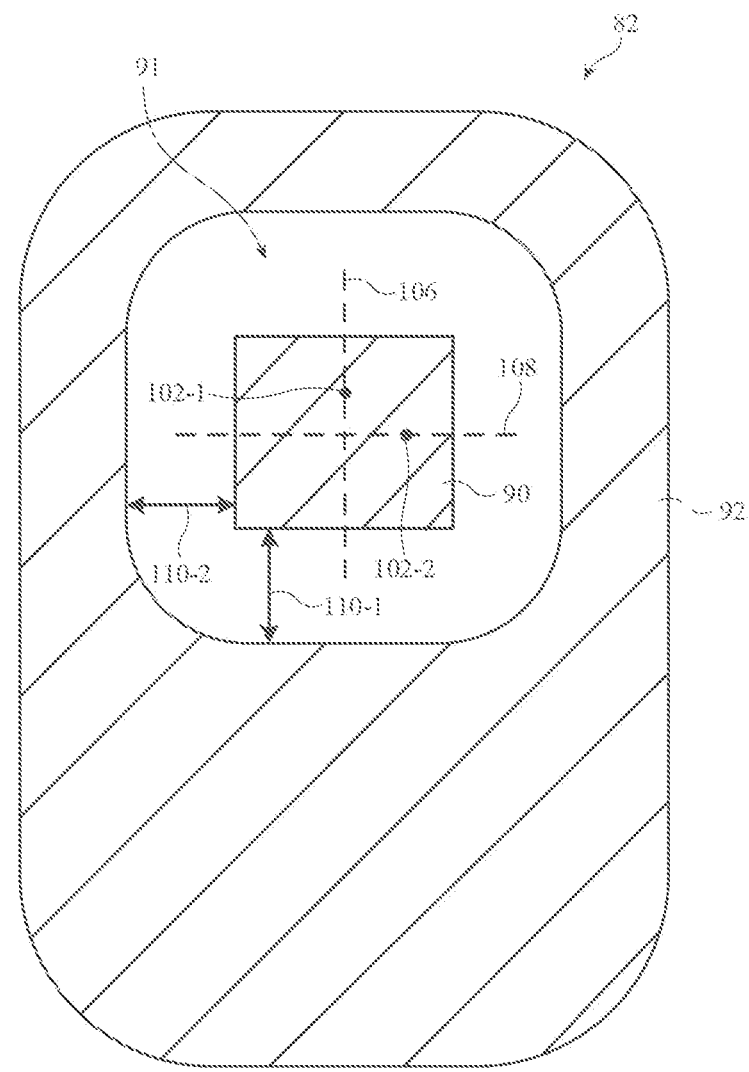
FIG. 4 is a top-down view of the wireless communication module of FIG. 3 in accordance with some embodiments.

FIG. 4 is a top-down view of the wireless communication module 82 of FIG. 3. As shown in FIG. 4, patch element 90 may have a rectangular outline (e.g., a square outline). Accordingly, the rectangle may have two main (central) perpendicular axes 106 and 108. Antenna feed terminal 102-1 may lie along axis 106. Antenna feed terminal 102-2 may lie along axis 108. Configured in such a manner, patch element 90 may be operable to convey radio-frequency signals having multiple polarizations. As an example, radio-frequency signals conveyed using terminal 102-1 may have a first linear polarization, and radio-frequency signals conveyed using terminal 102-2 may have a second linear polarization (that is orthogonal to the first linear polarization).

These configurations for patch element 90 are merely illustrative. If desired, patch element 90 may have any suitable shape or outline. If desired, one or more antenna feed terminals may be coupled to patch element 90 at one or more suitable locations. If desired, patch element 90 may convey radio-frequency signals of a single polarization or may convey radio-frequency signals of different circular polarizations.

As shown in FIG. 4, ground layer 92 may be separated from patch element 90 by dielectric gap 91 (e.g., an air gap or a gap filled by non-conductive material). Dielectric gap 91 may run all the way around the periphery of patch element 90. In other words, ground layer 92 may surround patch element 90 along each of the peripheral edges of patch element 90 and may have edges that run parallel to the corresponding peripheral edges of patch element 90. If desired, distances separating opposing edges of ground layer 92 and patch element 90 may be the same. In particular, distances 110-1 and 110-2 and corresponding distances between patch element 90 and ground layer 92 at other peripheral edges may be the same. If desired one or more of these distances may be different from each other.

The separation (e.g., distances 110-1 and 110-2) between patch element 90 and ground layer 92 imparted by dielectric gap 91 may be configured to allow sufficient space for wave formation. This may allow the radio-frequency signals conveyed by patch element 90 to have far-field characteristics (e.g., to exhibit plane waves, orthogonal electric and magnetic fields support each other). These distances may be based on the effective wavelength of operation for patch element 90 (e.g., the wavelength of operation adjusted by taking into account dielectric properties of the materials surrounding path element 90) to allow the radio-frequency signals to exhibit far-field characteristics.

As shown in FIG. 4, module 82 may have a rectangular outline with rounded corners. The rounded corners of module 82 may help accommodate module 82 into cramped spaces. Ground layer 92 may have inner edges that define an edge of gap 91 (e.g., a suitable separation from patch element 90). The inner edges of ground layer 92 may also have a rectangular outline with rounded corners to help maintain a suitable separation from patch element 90. Ground layer 92 may span from the inner edges to outer edges at the peripheral edges of module 82. This may help with improving the manufacturing process for module 82. In the example of FIG. 4, the rectangular outline of module 82 may have a geometric center, and the outline of patch element 90 may have a geometric center that is offset from the geometric center of module 82. If desired, other configurations for module 82 may be used.

Figure 5:
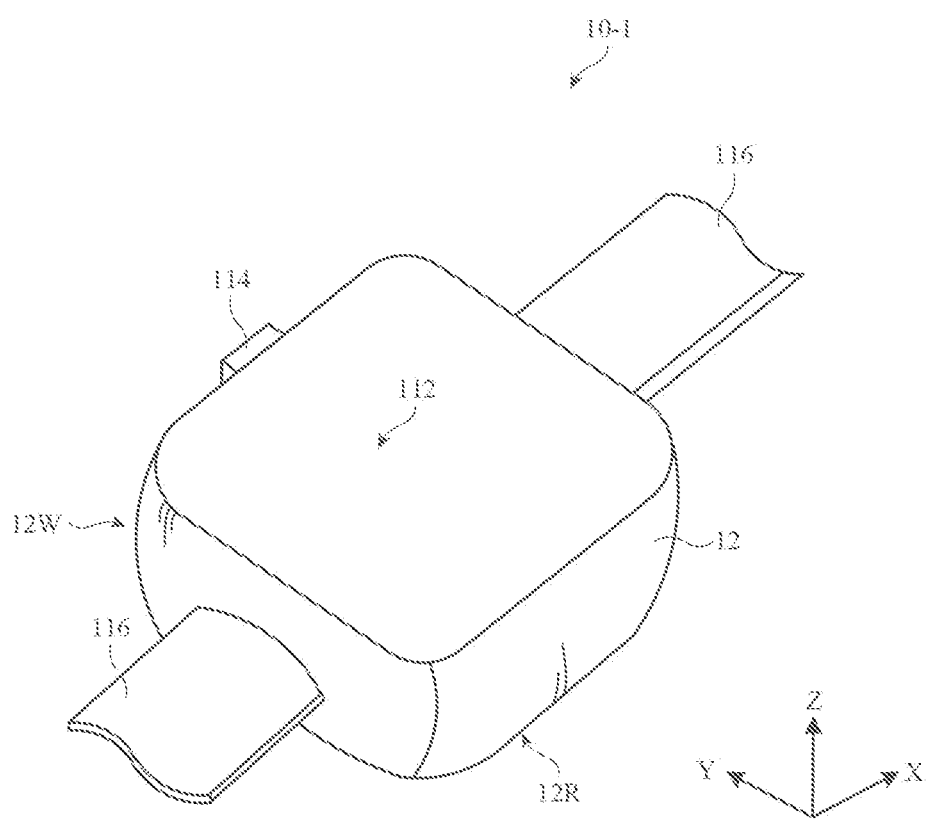
FIG. 5 is a perspective view of an illustrative electronic device in the wireless communication system of FIG. 1 in accordance with some embodiments.

In some configurations described herein as illustrative examples, device 10-1 may be a portable device such as a wristwatch device (e.g., a smart watch). Other configurations may be used for device 10-1 if desired. FIG. 5 is a perspective view of an illustrative portable electronic device that may implement device 10-1. In the example of FIG. 5, device 10-1 includes a display such as display 112. Display 112 may be mounted to a housing such as housing 12. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls such as sidewalls 12W or sidewalls formed from other materials. Examples of metal materials that may be used for forming sidewalls 12W include stainless steel, aluminum, silver, gold, metal alloys, or any other desired conductive material. Sidewalls 12W may sometimes be referred to herein as housing sidewalls 12W or conductive housing sidewalls 12W.

Display 112 may be formed at (e.g., mounted on) the front side (face) of device 10-1. Housing 12 may have a rear housing wall on the rear side (face) of device 10-1 such as rear housing wall 12R that opposes the front face of device 10-1. Conductive housing sidewalls 12W may surround the periphery of device 10-1 (e.g., conductive housing sidewalls 12W may extend around peripheral edges of device 10). Rear housing wall 12R may be formed from conductive materials and/or dielectric materials. Examples of dielectric materials that may be used for forming rear housing wall 12R include plastic, glass, sapphire, ceramic such as zirconia, wood, polymer, combinations of these materials, or any other desired dielectrics.

Rear housing wall 12R and/or display 112 may extend across some or all of the length (e.g., parallel to the X-axis) and width (e.g., parallel to the Y-axis) of device 10-1. Conductive housing sidewalls 12W may extend across some or all of the height of device 10-1 (e.g., parallel to the Z-axis). Conductive housing sidewalls 12W and/or rear housing wall 12R may form one or more exterior surfaces of device 10-1 (e.g., surfaces that are visible to a user of device 10-1) and/or may be implemented using internal structures that do not form exterior surfaces of device 10-1 (e.g., conductive or dielectric housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide housing walls 12R and/or 12W from view of the user).

Display 112 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies. Display 112 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10-1, for example.

Device 10-1 may include buttons such as button 114. There may be any suitable number of buttons in device 10-1. Buttons may be located in openings in housing 12 (e.g., openings in conductive housing sidewall 12W or rear housing wall 12R). Buttons may be rotary buttons, sliding buttons, buttons that are actuated by pressing on a movable button member, etc. Button members for buttons such as button 114 may be formed from metal, glass, plastic, or other materials.

Device 10-1 may, if desired, be coupled to a strap such as strap 116. Strap 116 may be used to hold device 10-1 against a user's wrist (as an example). Strap 116 may sometimes be referred to herein as wrist strap 116. In the example of FIG. 5, wrist strap 116 is connected to opposing sides of device 10-1. Conductive housing sidewalls 12W and/or rear housing wall 12R may include attachment structures for securing wrist strap 116 to housing 12 (e.g., lugs or other attachment mechanisms that configure housing 12 to receive wrist strap 116). Configurations that do not include straps may also be used for device 10-1.

Figure 6:
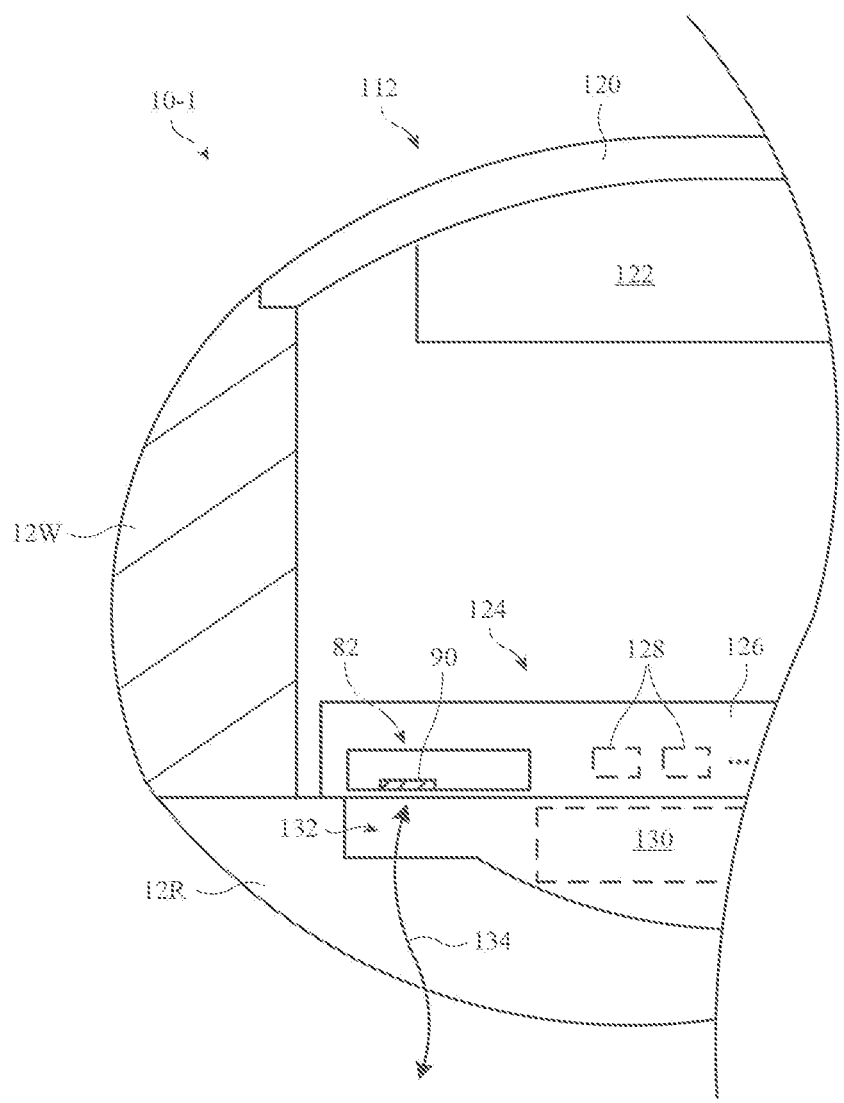
FIG. 6 is a cross-sectional view of an illustrative peripheral portion of an electronic device incorporating a wireless communication module in accordance with some embodiments.

FIG. 6 is a partial cross-sectional side view of electronic device 10-1 (FIG. 5) showing how an antenna in a wireless communication module may be mounted within device 10-1 for conveying radio-frequency signals through rear housing wall 12R. As shown in FIG. 6, display 112 may form the front face of device 10-1 whereas rear housing wall 12R forms the rear face of device 10-1. In the example of FIG. 6, rear housing wall 12R is formed from a dielectric material such as glass, sapphire, ceramic such as zirconia, or plastic. This is merely illustrative and, if desired, rear housing wall 12R may also include conductive portions (e.g., a conductive frame surrounding one or more dielectric windows in rear housing wall 12R, conductive cosmetic layers, etc.).

Display 112 may include a display cover layer 120 over a display module 122. Display module 122 may, for example, form an active area or portion of display 112 that displays images and/or receives touch sensor input. The lateral portion of display 112 that does not include display module 122 (e.g., portions of display 112 formed from display cover layer 120 but without an underlying portion of display module 122) may sometimes be referred to herein as the inactive area or portion of display 112.

Display module 122 may include conductive components (sometimes referred to herein as conductive display structures) that are used in forming portions of an antenna that radiates through the front face of device 10-1 (e.g., an antenna having a radiating element such as a radiating slot element defined by display module 122 and/or conductive housing sidewalls 12W). The conductive display structures in display module 122 may, for example, have planar shapes (e.g., planar rectangular shapes, planar circular shapes, etc.) and may be formed from metal and/or other conductive material that carries antenna currents for a front-facing antenna in device 10-1. The conductive display structures may include a frame for display module 122, pixel circuitry, touch sensor electrodes, an embedded near-field communications antenna, etc.

Display cover layer 120 may be formed from an optically transparent dielectric such as glass, sapphire, ceramic, or plastic. Display module 122 may display images (e.g., emit image light) through display cover layer 120 for view by a user and/or may gather touch or force sensor inputs through display cover layer 120. If desired, portions of display cover layer 120 may be provided with opaque masking layers (e.g., ink masking layers) and/or pigment to obscure the interior of device 10-1 from view of a user.

Substrates such as one or more rigid printed circuit boards, one or more flexible printed circuits, one or more package substrates, etc. may be located within the interior of device 10-1. In the example of FIG. 6, substrate 126 for a system package 124 (e.g., a system-in-package (SIP)) may be disposed within device 10-1. System components such as components 128 (e.g., one or more integrated circuits implementing control circuitry 14 or other circuitry, input-output circuitry 20 of FIG. 1, etc.) may be mounted to substrate 126.

It may be desirable to remove wired connector structures in an electronic device to provide a seamless exterior device surface, improve device waterproofing, and optimize useable device interior space by removing bulky connector components, etc. As an example, an electronic device can include wired connector ports for receiving for testing, debug, and/or restoring firmware on the electronic device or for other functions. It may be desirable to remove these wired ports and connectors.

To preserve the functionalities of the wired connector, it may be desirable to provide wireless circuitry that has one or more of the same functionalities. In the above example, it may be desirable to provide wireless connections for conveying test, debugging, and/or restoring the firmware of the electronic device. To maintain and/or improve existing applications of wired connection with wireless connections, the wireless connections may convey data using high data rates in a bidirectional wireless communication link. The wireless communication link may be established between wireless circuitry across a distance of less than 10 inches, less than five inches, less than four inches, less than two inches, less than one inch, etc., or across a distance of greater than one inch, greater than two inches, greater than five inches, etc. As examples, the wireless communication link may convey data using high data rate data transfer operations at speeds of 100 Kilobit per second or more, 1 Megabit per second (Mbps) or more, 100 Mbps or more, at 500 Mbps or more, 1 Gigabit bit per second or more, etc. to satisfactorily replace some wired connections (e.g., wired connection for conveying debug, test, restore and/or other data).

The examples of removing and/or replacing wired connections for conveying debug, test, and/or restore data are merely illustrative. If desired, it may be similarly desirable to remove and/or replace other wired connections such as USB wired connections or wired connections based on other protocols, or wired connections for conveying other types of signals with wireless connections (e.g., high data rate, bidirectional, and/or near-field wireless connections).

Given the limited device interior space, incorporating additional wireless circuitry (e.g., antennas and radio components) to implement these wireless connections may require compact and well-integrated antenna element implementations. Still referring to FIG. 6, an antenna module having antenna and a radio such as antenna module 82 (FIGS. 3 and 4) may be integrated into system package 124.

Antenna radiating element 90 may be disposed on the side of antenna module 82 facing rear housing wall 12R to convey radio-frequency signals 134 through rear housing wall 12R. To help with wave formation when convey radio-frequency signals through rear housing wall 12R, an opening such as opening 132 (sometimes referred to herein as a cavity or depression) may overlap antenna element 90. By providing a separation between antenna element 90 and rear housing wall 12R (e.g., the height of opening 132), wave formation can occur such that radio-frequency signals for the far-field region (e.g., having far-field characteristics such as plane waves, orthogonal electric and magnetic fields that support each other, etc.) may be conveyed. The separation provided by opening 132 may be based on the effective wavelength of operation for patch element 90 (e.g., the wavelength of operation adjusted by taking into account dielectric properties of the materials surrounding path element 90) to allow the radio-frequency signals to exhibit far-field characteristics.

Rear housing wall 12R may define one or more sides of opening 132. If desired, neighboring components such as components 130 may help define one or more sides of opening 132. In some illustrative examples, components 130 may include conductive structures such as an additional antenna radiating element (e.g., a rear facing antenna radiating element on rear housing wall 12R). If desired, the additional antenna radiating element may help define the peripheral boundaries of opening 132. If desired, other conductive or non-conductive components may help define the boundaries of opening 132.

Figure 7:
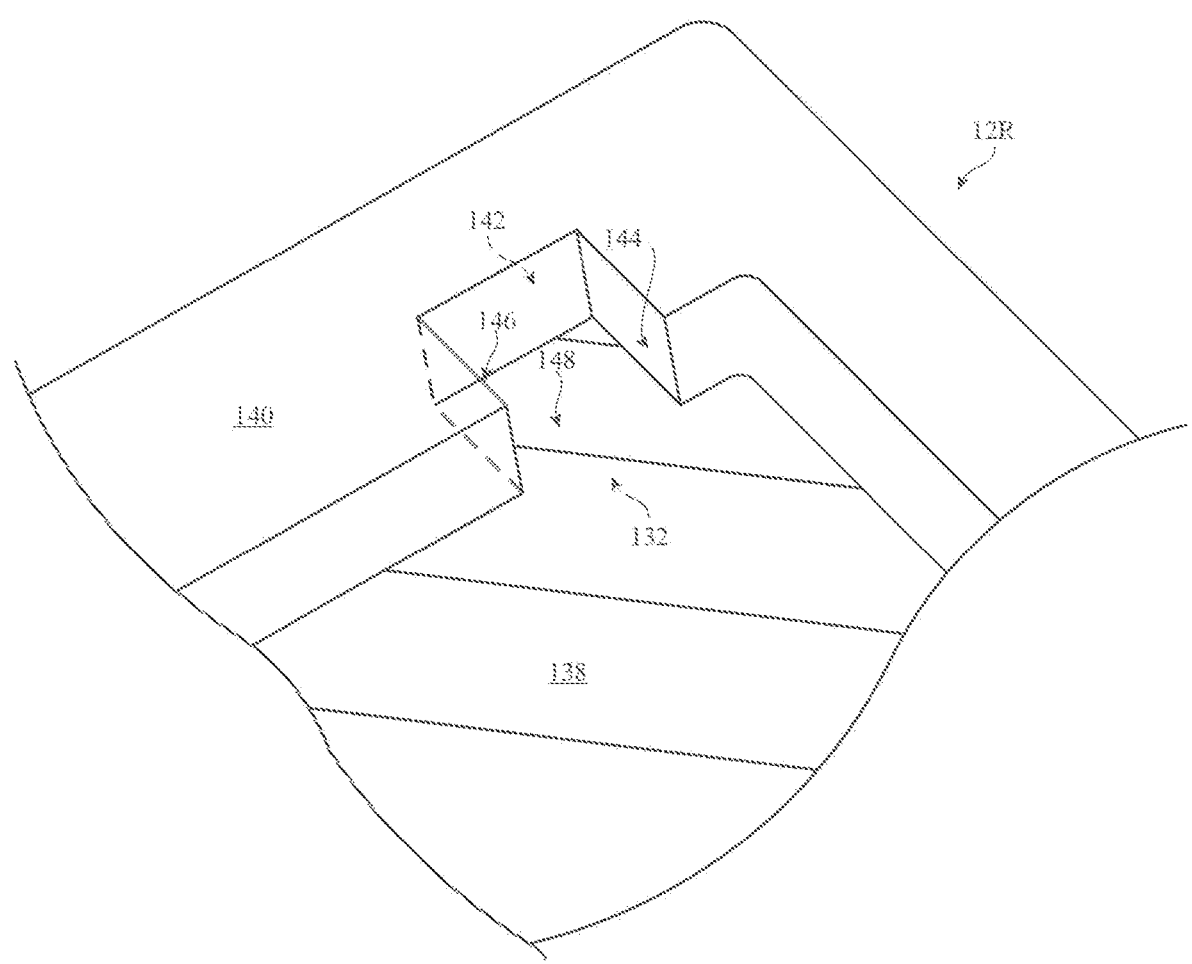
FIG. 7 is a perspective view of an illustrative corner region of a housing wall for the electronic device of FIG. 6 in accordance with some embodiments.

FIG. 7 is a perspective view of a corner region of the rear housing wall 12R in FIG. 6. As shown in FIG. 7, rear housing wall 12R may have a ledge portion such as ledge 140 that is raised from a lower surface 138 of housing wall 12R. Lower surface 138 may be a device interior surface of rear housing wall 12R, and an opposing surface of surface 138 may be a device exterior surface of rear housing wall 12R that defines the rear face of device 10-1. Ledge 140 may be a portion of rear housing wall 12R that is coupled (e.g., attached) to sidewalls 12W. Ledge 140 may run along at least two peripheral sides of device 10-1 as shown in FIG. 7 and may run along all four peripheral sides of device 10-1 (e.g., around the periphery of device 10-1). As shown in FIG. 7, the two portions of ledge 140 running along the two peripheral sides of device 10-1 may be joined at a corner of rear housing wall 12R.

In the example of FIG. 7, opening 132 aligned with antenna element 90 in FIG. 6 may be formed from a depression in ledge 140 along one of the peripheral sides of device 10-1. In particular, opening 132 may be formed at a corner region of ledge 140. This may allow antenna element 90 may be placed near the corner of device 10-1 in order to avoid interference from other components within device 10-1 and to provide a compact implementation.

Opening 132 may have peripheral sides (boundaries) defined by surfaces 142, 144, and 146 of ledge 140. In the example of FIG. 7, depression 132 is shown to extend from the top surface of ledge 140 to a bottom surface 148 that is coplanar with surface 138. However, this is merely illustrative. If desired, bottom surface 148 of depression 132 may still be raised relative to surface 138. In general, the depth of depression 132 (e.g., the position of bottom surface 148) and the width and length of depression 132 (e.g., the position of surfaces 142, 144, and 146) may be configured to allow for wave formation within opening 132 to help radio-frequency signals conveyed by antenna element 90 to exhibit far-field characteristics.

The configuration of FIG. 7 is merely illustrative. While different portions of rear housing wall 12R as shown to have planar surfaces, this is merely illustrative. If desired, one or more of these surfaces (e.g., surfaces 138, 142, 144, 146, 148, etc.) may be curved surfaces. While opening 132 (and consequently antenna element 90) is shown to be formed in a corner region of ledge 14 in rear housing wall 12R, opening 132 (and consequently antenna element 90) may instead be disposed in other suitable locations, if desired.

Figure 8:
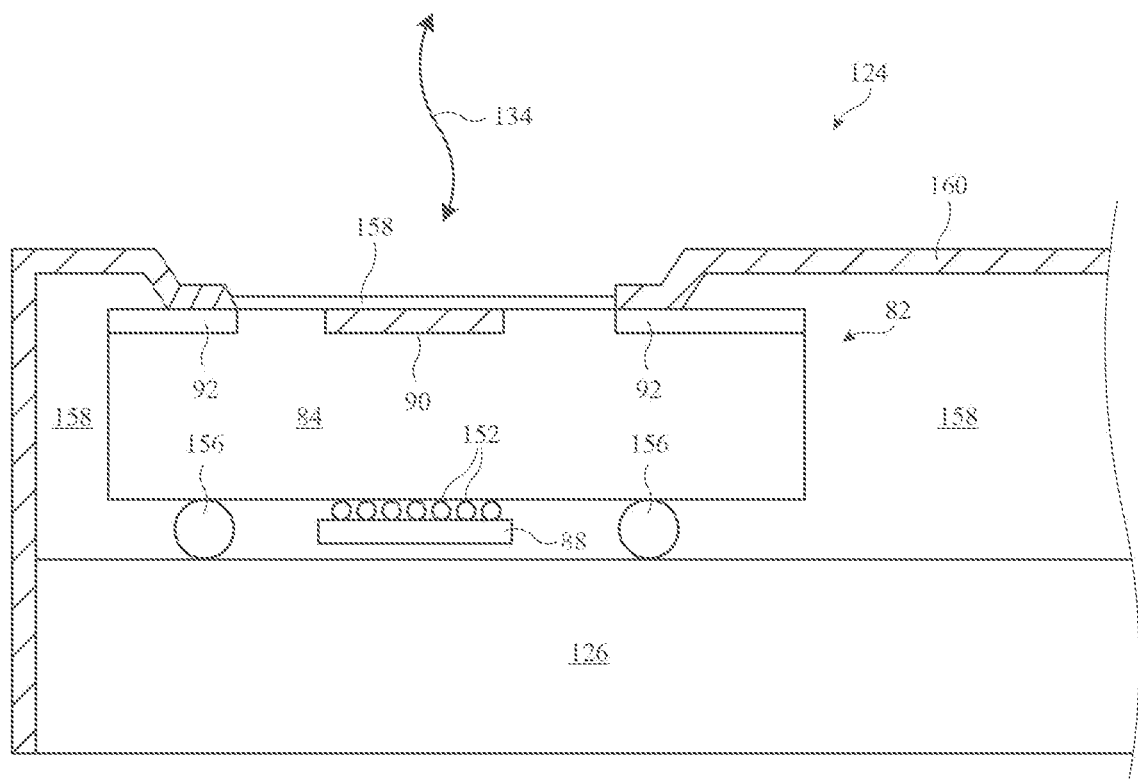
FIG. 8 is a cross-sectional view of a wireless communication module mounted to a package substrate in accordance with some embodiments.

FIG. 8 is a cross-sectional view of an illustrative system package (e.g., system-in-package (SIP)) such as system package 124 incorporating wireless communication module 82. As shown in FIG. 8, system package 124 may include a package substrate 126. A bottom surface of substrate 84 may be mounted to a top surface of package substrate 126. In particular, input-output structures on the bottom surface of substrate 84 may be electrically connected to input-output structures on the top surface of substrate 126 via solder such as solder balls 156. In such a manner, (signal) routing layers in substrate 126 may be electrically connected to (signal) routing layers in substrate 84 and thereby connected to radio component 88. Radio component 88 may be coupled to input-output structures on the bottom surface of substrate 84 via solder (e.g., solder balls or micro-bumps 152) and may be connected to routing layers in substrate 126 via routing layers in substrate 84.

An encapsulation material or encapsulant 158 may be used to encapsulate wireless communications module 82 and other components mounted to package substrate 126. In such a manner, encapsulation material 158 may surround substrate 84, solder 152 and 156, radio component 88, and other components in system package 124, thereby protecting them from contaminants and weathering. Encapsulation material 158 may also be formed along the top surface of substrate 84 (e.g., over antenna element 90).

A conductive (electromagnetic) shielding layer such as shielding layer 160 may be deposited (e.g., via sputtering) to cover encapsulation material 158, and one or more sides and/or surfaces of substrate 126, thereby shielding components in system package 124 from potential electromagnetic interference. An opening in encapsulation material 158 may be formed along the top surface of substrate 84 to expose a portion of antenna ground ring 92 (or contact pads connected to ground ring 92). Conductive shielding layer 160 may be electrically connected (shorted) to ground ring 92 at the opening in encapsulation material 158. Conductive shielding layer 160 may define an opening that overlaps or is aligned with antenna element 90 (e.g., by removing a portion of the conductive shielding layer 160). Antenna element 90 may therefore convey radio-frequency signals without being interfered by conductive shielding material 160.

Figure 9:
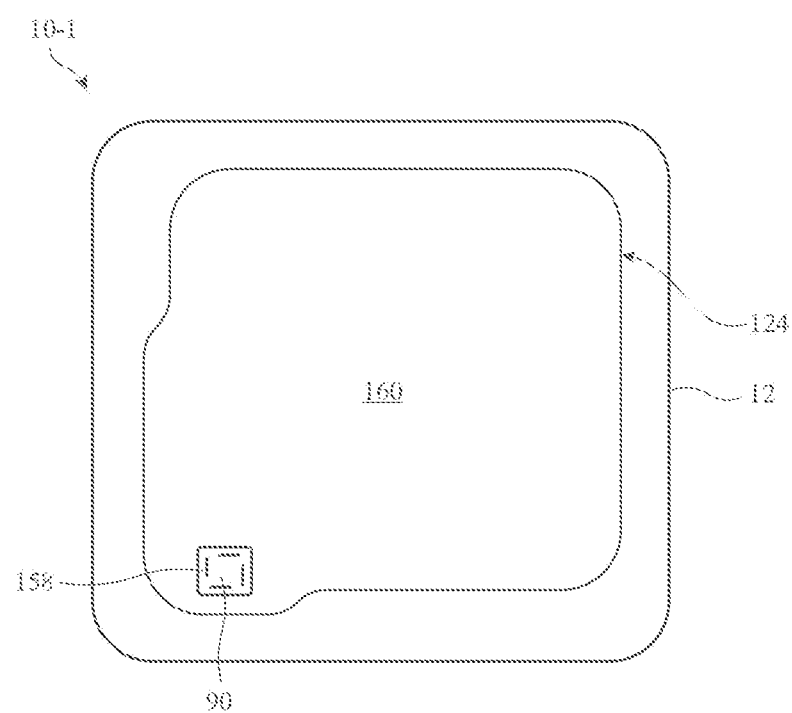
FIG. 9 is a plan view of an illustrative electronic device with a wireless communication module incorporated into a system-in-package in accordance with some embodiments.

FIG. 9 is a plan view of an illustrative electronic device such as device 10-1 having system package 124 incorporating a wireless communication module. As shown in FIG. 9, system package 124 may extend substantially across the rectangular outline of device 10-1 (e.g., extend from one sidewall 12W to the opposing sidewall 12W). In the example of FIG. 9, wireless communication module and antenna element 90 may be mounted at a corner region of system package 124 (e.g., at a corner region of device 10-1).

If desired, different functional systems (e.g., control circuitry, power management circuitry, other radio components, etc.) in device 10-1 may incorporated into system package 124 to form a system-in-package. In particular, encapsulation material (e.g., encapsulation material 158) may be formed over an entirety of the functional surface of system package 124 (e.g., over the entirety of one or more surfaces on the package substrate on which components are mounted). Similarly, conductive shielding layer 160 may extend across the entirety of system package 124 except an opening at which antenna element 90 is formed. The opening in shielding layer 160 may expose encapsulation material 158 under which antenna element 90 is disposed.

An electronic device such as device 10-1 may communicate wirelessly with one or more illustrative electronic devices (e.g., equipment external to device 10-1). In some illustrative configuration described herein as an illustrative example, device 10-1 may communicate wireless with device 10-2. In an illustrative configuration, device 10-2 may implement firmware testing, debugging, and/or restoring equipment configured to operate on the firmware of device 10-1 and may therefore sometimes be referred to as external test equipment. If desired, device 10-2 may serve other functions and interact with device 10-1 in any desired manner.

Figure 10:
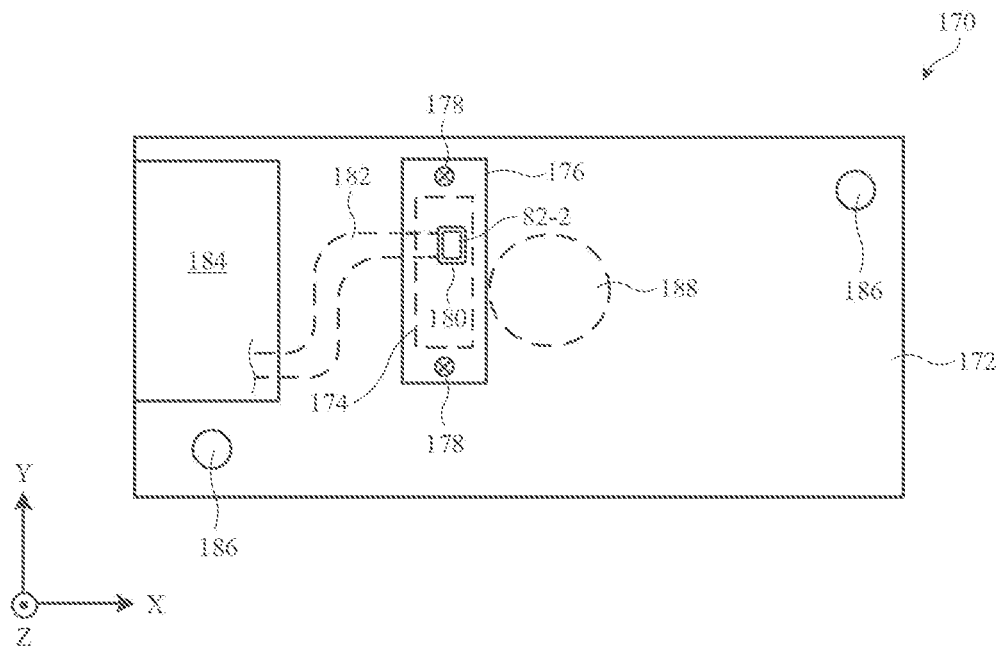
FIG. 10 is a plan view of illustrative external equipment in the illustrative wireless communication system of FIG. 1 having a wireless communication module in accordance with some embodiments.
Figure 11:
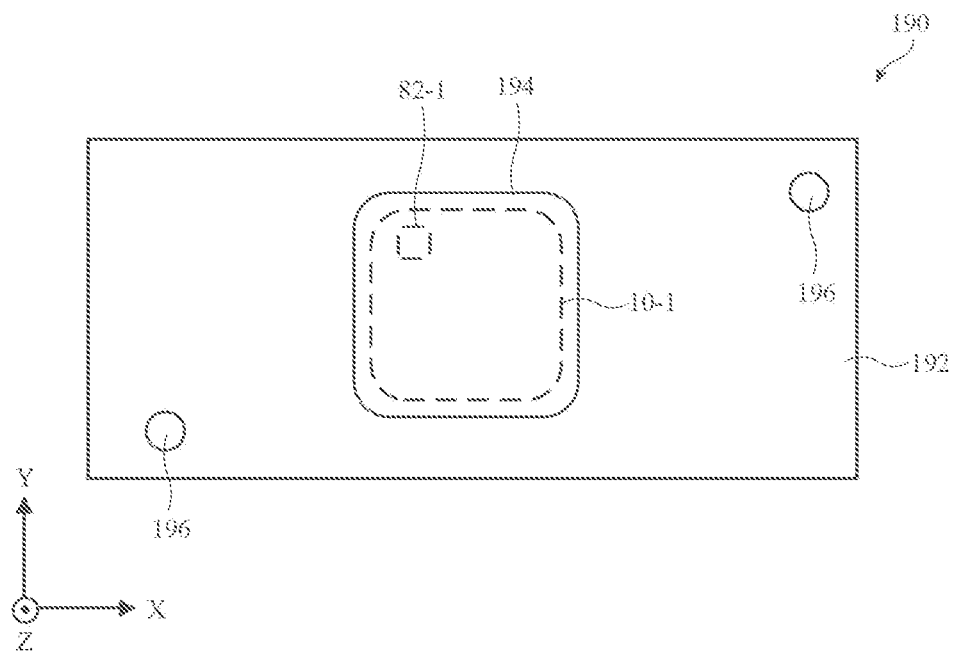
FIG. 11 is a top-down view of an illustrative electronic device carrier for the external equipment of FIG. 10 in accordance with some embodiments.

FIGS. 10 and 11 are diagrams showing different illustrative portions of device 10-2. FIG. 10 is a plan view of an illustrative dock such as dock 170 configured to wireless communicate with one or more devices such as device 10-1. In particular, dock 170 may be configured to perform firmware testing, debugging, and/or restoring or other functions for device 10-1 via wireless links.

In particular, device 10-2 may include support structure 172, which may be a platform onto which other functional portions of dock 170 such as control circuitry, wireless circuitry, and other circuitry are mounted. As shown in FIG. 10, device 10-2 may include a wireless circuitry such as wireless communication module 82-2 (e.g., a wireless communication module of the same configuration as wireless communication module 82 in FIGS. 3 and 4). In the illustrative configuration of FIG. 10, wireless communication module 82-2 may have a top surface (e.g., in the +z direction) on which a corresponding antenna element (e.g., antenna element 90 in FIGS. 3 and 4) is disposed. In other words, the antenna element is configured to convey radio-frequency signals out of the page in the +z direction. A radio component (e.g., radio component 88 in FIG. 3) for the antenna element may be mounted on the opposing bottom surface (e.g., in the −z direction) of wireless communication module 82-2.

To establish a more efficient communication link with other devices, wireless communication module 82-2 may be disposed on a support plate 174. Support plate 174 may be disposed over support structure 172 and may be configured to raise wireless communication 82-2 (in the +z direction) a suitable distance above support structure 172. This may help provide the appropriate distance between wireless communication module 82-2 and corresponding wireless circuitry in communication with wireless communication module 82-2. Alignment plate 176 may overlap support plate 174 and may include an opening 180. In particular, wireless communication modules 82-2 may lie within opening 180 in alignment plate 176. Alignment plate 176 may fix the relative position of wireless communication module 82 in the x-y plane to properly align with wireless circuitry in communication with wireless communication module 82-2. Alignment and attachment structures 178 such as screws may hold alignment plate 176 (and support plate 174) to support structure 172.

Wireless communication module 82-2 may have input-output structures that are coupled flexible printed circuit 182 (e.g., via solder). Flexible printed circuit 182 may connect wireless communication module 82-2 with other circuitry on printed circuit board 184. If desired, control circuitry for controlling the operation of device 10-2 (e.g., the testing, debugging, and/or restoring operations on the firmware of device 10-1) may be mounted to printed circuit board 184 and coupled to wireless communication module 82-2. If desired, printed circuit board 184 may include input-output ports to which control circuitry not mounted on printed circuit board 184 is coupled to connect to wireless communication module 82-2. In some illustrative configurations, other wireless circuitry such as coils and wireless power (transmitting) circuitry such as coils 64 and wireless power circuitry 62 (FIG. 1) may be provided on and mounted to support structure 172 at a location such as location 188. Configured at location 188, wireless power (transmitting) coils 64 may be aligned to corresponding wireless power (receiving) coils 34 when device 10-2 is in wireless communication with device 10-1 using module 82-2.

While support plate 174 and alignment plate 176 help fix the position of wireless communication module 82-2 relative to support structure 172, to properly enable a satisfactory communication link between dock 170 and device 10-1, device 10-1 may also be fixed in position relative to dock 170. Accordingly, device 10-2 may also include a device carrier such as carrier 190 in FIG. 11.

FIG. 11 is a top-down view of device carrier 190 configured to receive device 10-1 and rest on top of dock 170. When resting on top of dock 170, carrier 190 may provide the proper alignment between device 10-1 and the functional circuitry of dock 170 (e.g., wireless communication module 82-2, wireless power circuitry, etc.). In particular, carrier 190 may include a carrier platform 192 having an opening such as opening 194 configured to receive device 10-1. Carrier platform 192 may include surfaces and other mechanisms that hold device 10-1 in place on carrier platform 192 within opening 194. Opening 194 may be configured such that, when device 10-1 is in opening 194 and carrier 190 rests on dock 170, wireless communications module 82-1 in device 10-1 may be aligned with wireless communication module 82-1 (e.g., respective antenna radiating elements in the modules are aligned and overlap each other).

To properly rest carrier 190 on dock 170, carrier platform 192 may include alignment structures 196 that are configured to align with corresponding alignment structures 186 on support structure 172 in FIG. 10. As an example, support structure 172 may include alignment pins or posts 186, and respective openings 196 are configured to receive alignment structures 186. In such a manner, carrier 190 and consequently device 10-1 in carrier 190 may be mounted over and on top of support structure 172 in a fixed relative position.

Configured in this manner, wireless communication module 82-1 on wireless device 10-1 may overlap wireless communication module 82-2 in a fixed and predicable manner. Wireless communication modules 82-2 may therefore establish a robust and reliable wireless link with wireless communication module 82-1 to convey firmware test data, debug data, restore data, and/or other suitable data.

Figure 12:
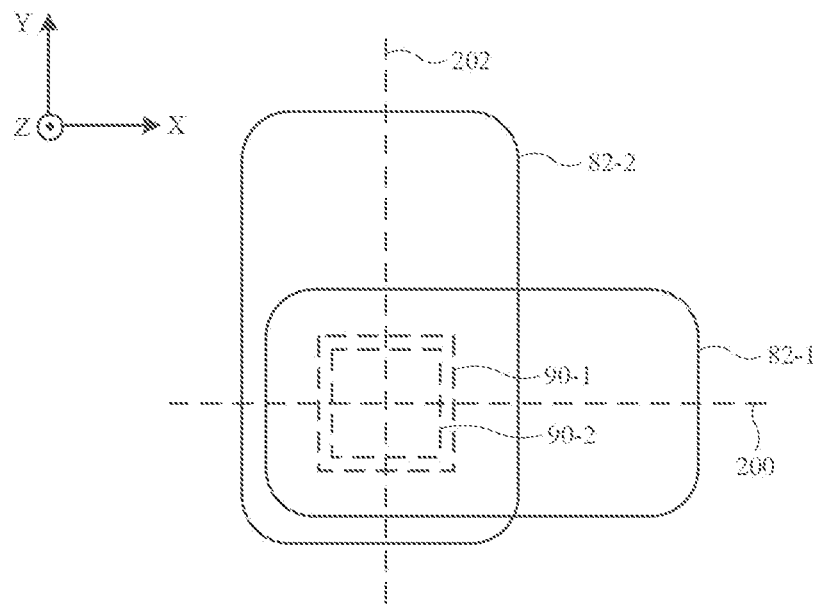
FIG. 12 is a diagram of an illustrative alignment between two wireless communication modules in accordance with some embodiments.
Figure 13:
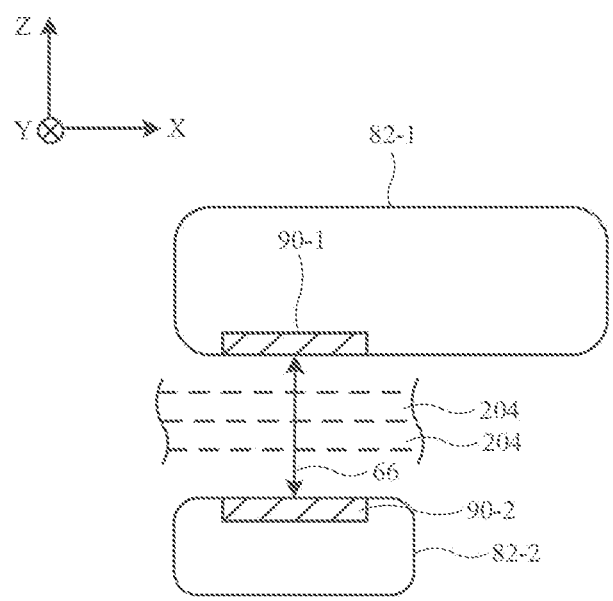
FIG. 13 is a diagram of two illustrative wireless communication modules communicatively coupled to each other via intervening structures in accordance with some embodiments.

FIGS. 12 and 13 are diagrams showing an illustrative alignment configuration between wireless communication modules 82-1 and 82-2. Configurations in which device 10-1 and device 10-2 include the same type of wireless communication module are described herein as an illustrative example. If desired, devices 10-1 and 10-2 may include wireless communication modules of different types that communicate with one another.

As shown in the top-down view of FIG. 12, when device 10-1 is aligned with device 10-2 (e.g., when device 10-1 in carrier 190 is mounted to dock 170), wireless communication modules 82-1 and 82-2 may be aligned in an orthogonal orientation. In particular, wireless communication module 82 (FIG. 4) may be elongated along a (length) dimension. The elongated dimension of communication module 82-1 in device 10-1 may run along axis 200, while the elongated dimension of communication module 82-2 in device 10-2 may run along axis 202. Axis 200 may be perpendicular to axis 202 (when one axis is projected onto the plane of the other axis). Module 82-1 may be configured to overlap module 82-2 such as that antenna 90-1 on wireless communication module 82-1 overlaps and faces antenna 90-2 on module 82-2.

In the illustrative configuration of FIG. 12, wireless communication modules 82-1 and 82-2 may convey radio-frequency signals with each other in multiple polarizations. As an example, each antenna element 90 (antenna element 90-1 and 90-2) may be coupled to first and second ports, each associated with convey radio-frequency signals with a different polarization. Furthermore, the first port may be configured to receive radio-frequency signals, whereas the second port may be configured to transmit radio-frequency signals.

In such a configuration, wireless communication modules 82-1 and 82-2 may be oriented in a perpendicular manner to each other in order to be able to receive what the other module transmits. As an example, wireless communication module 82-1 and 82-2 may both be configured to transmit radio-frequency signals with a first polarization associated with the elongated dimension (length) of the module and to receive radio-frequency signals with a second polarization associated with the shorter dimension (width) of the module. As such, when the length of module 82-1 is aligned with the width of module 82-2, as shown in FIG. 12, module 82-2 may receive radio-frequency signals from module 82-1 because they are aligned to convey radio-frequency signals of the same polarization. Analogously, when the length of module 82-2 is aligned with the width of module 82-1, as shown in FIG. 12, module 82-1 may receive radio-frequency signals from module 82-2 because they are aligned to convey radio-frequency signals of the same polarization.

As shown in the side view of FIG. 13, overlapping antenna elements 90-1 and 90-2 may convey radio frequency signals 66 across one or more structures 204. As examples, structures 204 may include one or more layers of air gap, housing structures, support structures, other intervening dielectric material, etc. As described in connection with FIG. 6, one or more air gaps may be provided along the communication channel between antenna elements 90-1 and 90-2 (e.g., in housing wall 12R in device 10-1) to allow far-field (plane) waves to be properly generated. If desired, other dielectric materials (other than air) that modify the radio-frequency characteristics of the communication channel may also be provided along the communication channel between antenna elements 90-1 and 90-2 (e.g., one or more dielectric materials mounted to antenna element 90-2 at device 10-2). While antenna elements 90-1 and 90-2, when in communication, may be separated by a distance (on the order of centimeters or tens of centimeters) less than 15 centimeters, less than 10 centimeters, less than 5 centimeters, less than 3 centimeters, less than 1 centimeters, greater than 1 centimeter, greater than 2 centimeters, greater than 3 centimeters, etc., the radio-frequency signals at frequencies greater than 10 GHz conveyed by antenna elements 90-1 and 90-2 may exhibit far-field characteristics.

The configurations of FIGS. 12 and 13 are merely illustrative. If desired, antenna elements 90-1 and 90-2 may convey radio-frequency signals in other suitable manners. In some illustrative configurations, antenna elements 90-1 and 90-2 may not necessarily align their geometric centers along the z-axis. In other words, there may be some offset (partial overlap) between the outline of antenna element 90-1 along the x-y plane and the outline of antenna element 90-2 along the x-y plane when viewed from the z-direction. These offsets may be useful in providing manufacturing and/or placement tolerance as perfect alignment (complete overlap along the z-axis) is not necessary.

Device 10 (e.g., one or more of devices 10-1, 10-2, and other devices in system 8) may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device having first and second opposing sides comprising:
   a housing having a housing portion on the first side;
   a display on the second side mounted to the housing;
   a system package substrate in the housing;
   a wireless communication module mounted to the system package substrate, the wireless communication module including:
      a module substrate mounted to the system package substrate; and
      a conductive patch on the module substrate configured to convey radio-frequency signals through the housing;
   encapsulation material disposed on the system package substrate and around the wireless communication module; and
   conductive shielding material disposed over the encapsulation material, the conductive shielding material defining an opening aligned with the conductive patch.

2. The electronic device defined in claim 1, wherein the wireless communication module includes a radio-frequency integrated circuit mounted to the module substrate and coupled to the system package substrate through the module substrate.

3. The electronic device defined in claim 2 further comprising:
an integrated circuit for control circuitry coupled to the radio-frequency integrated circuit and mounted to the system package substrate.

4. The electronic device defined in claim 2, wherein the conductive patch is disposed on a first surface of the module substrate and the radio-frequency integrated circuit is mounted to a second surface of the module substrate opposite the first surface.

5. The electronic device defined in claim 4, wherein the wireless communication module includes an antenna ground ring on the first surface that surrounds the conductive patch, an antenna ground layer embedded in the module substrate, and conductive vias in the module substrate that couple the antenna ground ring to the antenna ground layer.

6. The electronic device defined in claim 1, wherein the wireless communication module includes an antenna ground structure on the module substrate that is coupled to the conductive shielding material.

7. The electronic device defined in claim 1, wherein the housing includes peripheral sidewalls that run along a periphery of the electronic device, and the system package substrate extends between the peripheral sidewalls and has peripheral edges that run along the periphery of the electronic device.

8. An electronic device comprising:
a display;
a housing to which the display is mounted;
a wireless communication module that includes:
    a substrate having first and second opposing surfaces;
    an antenna element disposed on the first surface of the substrate and configured to convey radio-frequency signals through a portion of the housing; and
    a radio component mounted to the substrate and coupled to the antenna element; and
a system substrate, wherein the second surface of the substrate of the wireless communication module is mounted to the system substrate; and
encapsulation material on the system substrate that encapsulates the wireless communication module and overlaps the antenna element.

9. The electronic device defined in claim 8 further comprising:
shielding material on the encapsulation material that overlaps the system substrate, wherein the shielding material defines an opening that overlaps the antenna element.

10. The electronic device defined in claim 8, wherein the wireless communication module includes a ground ring on the first surface that surrounds the antenna element, and the radio component comprises a radio-frequency integrated circuit mounted to the second surface of the substrate of the wireless communication module.

11. The electronic device defined in claim 8, wherein the antenna element is aligned with a depression in a housing wall of the housing and wherein the antenna element is configured to convey the radio-frequency signals through the encapsulation material and the depression in the housing wall.

12. The electronic device defined in claim 11, wherein the housing wall has a first interior surface and a ledge portion that rises above the first interior surface to a second interior surface, and the depression is in the ledge portion along the second interior surface.

13. The electronic device defined in claim 8, wherein the housing has first and second sidewalls that run along a periphery of the electronic device and are joined at a corner region of the housing, and the wireless communication module overlaps the corner region of the housing.

14. The electronic device defined in claim 8, wherein the portion of the housing wall is formed from ceramic material.

15. A wireless communication module comprising:
a substrate having first and second surfaces and peripheral edges extending between the first and second surfaces:
an antenna radiating element on the first surface;
an antenna ground structure on the first surface, surrounding the antenna radiating element, and extending to the peripheral edges of the substrate;
a radio-frequency integrated circuit mounted to the second surface and coupled to the antenna radiating element; and
input-output structures at the second surface.

16. The wireless communication module defined in claim 15, wherein the radio-frequency integrated circuit is configured to control the antenna radiating element to convey radio-frequency signals associated with firmware data at a frequency greater than 10 GHz.

17. The wireless communication module defined in claim 15, wherein the antenna radiating element comprises a patch antenna element, the radio-frequency integrated circuit is coupled to first and second positive antenna feed terminals at the patch antenna element, and the radio-frequency integrated circuit is configured to control the antenna radiating element to form a half-duplex communication link with external wireless communication equipment.

18. The wireless communication module defined in claim 15, wherein the antenna ground structure comprises an antenna ground ring.

19. The wireless communication module defined in claim 18 further comprising:
an antenna ground layer embedded in the substrate; and
conductive vias in the substrate that couple the antenna ground ring to the antenna ground layer.

* * * * *